US007200815B2

(12) United States Patent
Crain et al.

(10) Patent No.: US 7,200,815 B2
(45) Date of Patent: Apr. 3, 2007

(54) METHODS AND DEVICES FOR RECONSTRUCTING VISUAL STIMULI OBSERVED THROUGH BROWSER-BASED INTERFACES OVER TIME

(75) Inventors: Kenneth H. Crain, Irving, TX (US); William K. Vanover, Crowley, TX (US)

(73) Assignee: Schlucktronix LLC, Los Altos, CA (US)

( * ) Notice: Subject to any disclaimer, the term of this patent is extended or adjusted under 35 U.S.C. 154(b) by 427 days.

(21) Appl. No.: 09/812,394

(22) Filed: Mar. 19, 2001

(65) Prior Publication Data

US 2001/0035876 A1   Nov. 1, 2001

Related U.S. Application Data

(60) Provisional application No. 60/190,431, filed on Mar. 17, 2000.

(51) Int. Cl.
G06F 13/00 (2006.01)
G06F 15/00 (2006.01)

(52) U.S. Cl. .................. 715/760; 715/762; 715/851
(58) Field of Classification Search ............. 715/853, 715/854, 765, 859, 861, 762, 840, 760, 763, 715/764, 851, 852; 315/762, 763, 852, 853, 315/855, 863
See application file for complete search history.

(56) References Cited

U.S. PATENT DOCUMENTS

| | | | |
|---|---|---|---|
| 5,564,005 A | 10/1996 | Weber et al. | |
| 5,737,726 A | 4/1998 | Cameron et al. | |
| 5,890,152 A * | 3/1999 | Rapaport et al. | 707/6 |
| 5,893,053 A | 4/1999 | Trueblood | |
| 5,928,330 A | 7/1999 | Goetz et al. | |
| 5,951,643 A | 9/1999 | Shelton et al. | |

(Continued)

FOREIGN PATENT DOCUMENTS

EP   0 944 009 A2   9/1999

(Continued)

OTHER PUBLICATIONS

Nakajima A., et al; "Transformation of Web Event Sequences for Analysis of User's Web Operation" 1999 IEEE International Conference on Systems Man and Cybernetics. Tokyo Research Laboratory, vol. 4 of 6 Oct. 19, 1999 pp. 111-116.

(Continued)

Primary Examiner—Cao (Kevin) Nguyen
(74) Attorney, Agent, or Firm—Jackson Walker L.L.P.; Robert C. Klinger (57) ABSTRACT

A method and apparatus of the invention allows an operator to identify a specific article of online-content to be reconstructed and displayed, and specify a duration of time to be used when graphically representing what areas of the visual stimuli were actually visible to the user. The invention is a method for retrieving multiple instances of an article of online content from a database of previously recorded content. In yet another invention is a method for reconstructing visual stimuli as originally displayed to a user as one form of composition. Still another invention is a method for reconstructing a field of visual stimuli that could be observed by a user as one form of composition.

22 Claims, 7 Drawing Sheets

U.S. PATENT DOCUMENTS

| | | |
|---|---|---|
| 5,960,200 A | 9/1999 | Eager et al. |
| 6,035,332 A | 3/2000 | Ingrassia, Jr. et al. |
| 6,046,741 A | 4/2000 | Hochmuth |
| 6,084,584 A | 7/2000 | Nahi et al. |
| 6,101,510 A | 8/2000 | Stone et al. |
| 6,112,181 A | 8/2000 | Shear et al. |
| 6,263,365 B1 | 7/2001 | Scherpbier |
| 6,272,467 B1 | 8/2001 | Durand et al. |
| 6,385,590 B1 * | 5/2002 | Levine ....................... 705/10 |
| 6,456,305 B1 | 9/2002 | Qureshi et al. |
| 6,496,803 B1 * | 12/2002 | Seet et al. ................... 705/14 |
| 6,546,393 B1 | 4/2003 | Khan |
| 6,583,800 B1 * | 6/2003 | Ridgley et al. ............. 715/854 |
| 6,667,751 B1 | 12/2003 | Wynn et al. |
| 6,675,162 B1 * | 1/2004 | Russell-Fallas et al. ....... 707/5 |
| 2002/0169650 A1 | 11/2002 | Dougherty et al. |
| 2002/0194018 A1 | 12/2002 | Scott |
| 2002/0198733 A1 | 12/2002 | Sawa et al. |
| 2003/0046244 A1 | 3/2003 | Shear et al. |
| 2003/0069749 A1 | 4/2003 | Shear et al. |
| 2003/0135400 A1 | 7/2003 | Mellander |
| 2004/0064358 A1 | 4/2004 | Hill et al. |

FOREIGN PATENT DOCUMENTS

| | | |
|---|---|---|
| WO | WO 98/10349 | 12/1998 |
| WO | WO 99/40525 | 12/1999 |

OTHER PUBLICATIONS

"Web Display Profiling"; Research Disclosure, Kenneth Mason Publication, Hampshire, GB No. 427, Nov. 1999 pp. 1522.

* cited by examiner

| WINDOW ID 315 | PARENT ID 316 | TIME STAMP 317 | EVENT ID 318 | EVENT TYPE 319 | WINDOW POSITION 320 | WINDOW SIZE 321 | NETWORK ADDRESS 322 | SCROLL OFFSET 323 | WINDOW IMAGE 324 | CONTENT IMAGE 325 326 |
|---|---|---|---|---|---|---|---|---|---|---|
| A123 |  | 000001 | B002 | load | 0,0 | 800,600 | home.html | 0,0 |  |  |
| A345 | A123 | 000002 | B003 | load | 0,0 | 800,200 | topnav.html | 0,0 | A345.bmp | A345c.bmp |
| A402 | A123 | 000008 | B004 | load | 0,201 | 150,400 | leftnav.html | 0,0 | A402.bmp | A402c.bmp |
| A977 | A123 | 000011 | B005 | load | 151,201 | 650,400 | article.html | 0,0 | A977.bmp | A977c.bmp |
| A977 | A123 | 000303 | B006 | scroll | 151,201 | 650,400 | article.html | 0,50 | A977.bmp | A977c.bmp |
| A977 | A123 | 000601 | B007 | scroll | 151,201 | 650,400 | article.html | 0,100 | A977.bmp | A977c.bmp |
| A977 | A123 | 000902 | B008 | scroll | 151,201 | 650,400 | article.html | 0,200 | A977.bmp | A977c.bmp |
| C199 |  | 001226 | B009 | load | 0,0 | 800,600 | newpage.html | 0,0 |  |  |
| F009 | C199 | 001229 | B010 | load | 0,0 | 800,300 | top.html | 0,0 | F009.bmp | F009c.bmp |
| F546 | C199 | 001300 | B011 | load | 0,301 | 800,300 | bottom.html | 0,0 | F546.bmp | F546c.bmp |

METHODS AND DEVICES FOR RECONSTRUCTING VISUAL STIMULI OBSERVED THROUGH BROWSER-BASED INTERFACES OVER TIME

CROSS-REFERENCE TO RELATED APPLICATIONS

This application is related to and claims priority from pending Provisional U.S. Patent Application Ser. No. (60/190,431) entitled "METHOD AND DEVICES FOR RECONSTRUCTING VISUAL STIMULI OBSERVED THROUGH BROWSER-BASED INTERFACES OVER TIME", by Crain, et al., filed Mar. 17, 2000. In addition, this application is related to co-pending U.S. patent application Ser. Nos. 09/812,392 and 09/812,393, entitled "METHODS AND DEVICES FOR RECORDING CHANGES IN VISUAL STIMULI OBSERVED THROUGH BROWSER-BASED INTERFACES", by Crain, et al., filed on Mar. 19, 2001, which is incorporated by reference herein in its entirety.

BACKGROUND

1. Technical Field

The present invention relates generally to computer systems, and browser-based interfaces used to display online-content to a user. More specifically, the invention relates to methods and devices for reconstructing the visual stimuli originally displayed to a user through browser-based interfaces.

2. Problem Statement

The utilization of an information-browser paradigm, meaning information stored at a location remote from a user is delivered to the user via a browser connected to a network, has grown exponentially with the global adoption of the Internet, hypertext mark-up language (HTML), and extensible mark-up language (XML). The concept of an information-browser model extends beyond traditional HTML/XML data accessible via the Internet, encompassing a variety of data formats accessible via private networks such as Intranets and Extranets, as well as information retrieval interfaces, such as those used in Personal Digital Assistants (PDAs), and single-purpose devices (commonly referred to as "Internet appliances"). For the purposes of explanation, these applications and devices, and their substitutes and successors, will be collectively referred to as "browsers," with the information they present to the user referred to as "online-content." Online content is viewed and manipulated at a browser through a browser interface.

As near instant access to information through the information-browser model becomes a mainstay of global commerce, increased attention is being focused on the usability and clarity of purpose of online-content as it is displayed to a user. Being able to record the visual stimuli that is being presented to the user at any given time enables the study of how users react to that stimuli. Accordingly, the ability to accurately and efficiently record online-content is becoming a critical goal of the content design process.

One barrier to studying the visual stimuli people observe while interacting with on-line content though a browser is the inflexibility of the browser interface itself. It is known that online-content contains a variety of textual and binary (typically encompassing graphics) data that is interpreted by a browser and displayed to a user. The manner in which this content is displayed is not only dependent on the type of browser being used, but also the environmental context in which the browser is being used. For example, a web page that appears one way when displayed in a Microsoft based browser will appear entirely different when displayed in a Netscape based browser.

This environmental context problem exist on the operating system level of a computer or device, and extends to specific properties of the computer's configuration. The environmental context problem is both hardware and software related, and encompasses items such as color depth (aggregate number of simultaneous colors the device is capable of displaying), and screen real estate (physical screen size and aspect ratio). In addition, many browser interfaces enable content designers to nest multiple instances of a browser (commonly referred to as windows or frames), thereby creating multiple instances of content that together comprise the entire visual stimuli. In such cases, the location, size, and aspect ratio of each instance of the browser and the juxtaposition of one window to another contribute to the complexity that must be untangled to understanding how the content is being displayed to the user. Furthermore, many browser interfaces include the capability to manipulate the content being displayed either through data entry, navigation, or horizontal and/or vertical scrolling. In such cases, determining exactly what visual stimuli is being displayed to the user is also dependent on the size and aspect ratio of the original content, and its horizontal and/or vertical positioning within the browser interface.

The most common approaches to these problems involve attempting to recreate the original usage parameters through standards such as browser version and manufacturer, operating system version and manufacturer, and display size and aspect ratio. Then, using these general parameters, an operator revisits the pages of online-content originally viewed by the user based on a pre-recorded transactional log of network addresses (such as an Internet Uniform Resource Locator or URL). One deficiency in this approach is that it does not take into consideration many of the technical parameters that significantly impact the exact visual stimuli being displayed such as browser window size and the vertical and/or horizontal offset of online-content within the browser window. Another deficiency in this approach is that it does not rely on recorded information detailing exactly what parameters existed for a specific instance in time, and how these parameters may change over time. Another deficiency in this approach is that the original online-content as visited by the user may have changed over time, thus changing the very nature of the visual stimuli being displayed to the user. Yet another deficiency in this approach is that it does not provide a method of distinguishing between those areas of the online-content which were visible (because of scrolling) during a specific period from those that were not. Accordingly, there is a need for methods and devices for identifying and recreating the visual stimuli presented to a user of browser-based interfaces while interacting with online-content.

SUMMARY OF THE INVENTION

The present invention provides technical advantages as solutions to the problems encountered when attempting to reconstruct visual stimuli displayed to a user as they interact with online-content, preferably through a browser interface. The invention recreates visual stimuli through a variety of compositions, based on a pre-recorded database of parameters and data. In one embodiment, the parameters and data have been determined to perhaps impact the manner in which online-content is being displayed to the user.

In another embodiment, the invention allows an operator to identify a specific article of online-content to be reconstructed and displayed, and specify a duration of time to be used when graphically representing what areas of the visual stimuli were actually visible to the user. First, the operator selects an article of online-content based on its original network address, or from a substitute name from a database that contains a record of all online-content visited by the original user. Next, the operator enters a specific duration of time to reconstruct, preferably by using slider-bar, a timeline equal to duration, preferably the maximum duration, that the online content was visible to the original user. Next, the user selects from various compositions that can be used to represent the visual stimuli as it was originally displayed to the user. Finally, the original visual stimuli displayed to the user is recreated based on the article of online content and period of time specified, using the selected form of composition.

In yet another embodiment, the invention is a method for retrieving multiple instances of an article of online content from a database of previously recorded content. The invention aggregates the visual stimuli originally displayed to a user taking into consideration how many times the article of online-content was displayed, the events which took place while the online-content was visible, and the duration of each of the user's visual experience. First, the method searches a database for unique instances of the article of online content, and records the unique id of each browser window in which the online-content was originally displayed. Next, the invention enumerates through each dependent child browser window that comprised the visual stimuli for the article of online-content using the parent browser window's unique identification (ID) as a key, recording each child window's unique ID. Then the method calculates the maximum duration that each article of online-content was visible by summing the duration of time that occurred between events resulting in changes in the visual stimuli. Furthermore, the method returns the data necessary to reconstruct the visual stimuli, and a timeline representing the duration for which each instance of the visual stimuli was visible to the user.

In yet a further embodiment, the invention is a method for reconstructing visual stimuli as originally displayed to a user as one form of composition. First, the method calculates a two-dimensional boundary of a parent window based on its previously recorded two-dimensional size, and then renders a container of the same size. Next, the method enumerates through one or more previously recorded graphical images stored in a database, writes them to the parent container, and arranges them in a composition based on the recorded two-dimensional size and location (within the original browser-interface).

Still another embodiment of the invention is a method for reconstructing a field of visual stimuli that could be observed by a user as one form of composition. First, the method calculates the two-dimensional boundaries of a parent window based on its previously recorded two-dimensional size, and renders a container of the same size. Next, the method enumerates through one or more previously recorded graphical images representing the entire field of visual stimuli which could be observed for each article of online content based on its native size and aspect ratio, and writes them to the parent container. Then the method arranges the images in a composition using logic which takes into consideration their recorded two-dimensional size and location within the original browser-interface, adjusting their two-dimensional position within the parent container to accommodate for any differences in their native size and aspect ratio vs. the recorded size and aspect ratio of the browser window in which they were originally displayed. Furthermore, the method colorizes (masks) any voids left in the new composition, to more clearly illustrate that these areas were not part of the original composition.

The invention also provides a method for colorizing regions of a reconstructed visual stimuli to help illustrate the areas of the original online content that were displayed. First, the method reconstructs the visual stimuli originally displayed to the user through one or more compositions. Next, the method calculates the visible area for each instance of online content as it was originally displayed within the browser window, and does so based on both the original size and aspect ratio of the window itself, and the two-dimensional offset of the online content within that window (typically caused by scrolling). Then the method aggregates these calculations for each article of online content by summing the regions of each article that were eventually displayed to the user. Furthermore, the method colorizes any region of the composition that was not found to be displayed to the user within the period of time specified.

The methods may be embodied as manufactured devices. For example, the methods may be placed on a computer readable medium, such as a computer diskette, CD ROM, or other memory device. In addition, the methods may be placed in a computer memory or hard-written onto a processor to enable a general computing device to be transformed into a specific computing machine, or specific system. A computer system may be set up as a network capable of executing any of the methods. One such network could be the internet, and the network could employ an application service provider. In addition, the invention may be embodied as one or more data signals that transform a general network into a task-specific network (or, task specific distributed machine).

Of course, other features and embodiments of the invention will be apparent to those of ordinary skill in the art. After reading the specification, and the detailed description of the exemplary embodiment, these persons will recognize that similar results can be achieved in not dissimilar ways. Accordingly, the detailed description is provided as an example of the best mode of the invention, and it should be understood that the invention is not limited by the detailed description. Accordingly, the invention should be read as being limited only by the claims.

BRIEF DESCRIPTION OF THE DRAWINGS

Various aspects of the invention, as well as an embodiment, are better understood by reference to the following detailed description. To better understand the invention, the detailed description should be read in conjunction with the drawings in which.

DETAILED DESCRIPTION OF A BEST MODE

The present invention provides methods and devices for reconstructing visual stimuli originally observed by a user as the user interacted with online content, preferably through a browser-based interface. The reconstructed visual stimuli can be used for the purposes of real-time or post-analysis.

Interpretative Considerations

When reading this section (Detailed Description of a Best Mode, which describes an exemplary embodiment of the best mode of the invention, hereinafter "exemplary embodiment"), one should keep in mind several points. First, the following exemplary embodiment is what the inventor believes to be the best mode for practicing the invention at the time this patent was filed. Thus, since one of ordinary skill in the art may recognize from the following exemplary embodiment that substantially equivalent structures or substantially equivalent acts may be used to achieve the same results in exactly the same way, or to achieve the same results in a not dissimilar way, the following exemplary embodiment should not be interpreted as limiting the invention to one embodiment.

Likewise, individual aspects (sometimes called species) of the invention are provided as examples, and, accordingly, one of ordinary skill in the art may recognize from a following exemplary structure (or a following exemplary act) that a substantially equivalent structure or substantially equivalent act may be used to either achieve the same results in substantially the same way, or to achieve the same results in a not dissimilar way.

Accordingly, the discussion of a species (or a specific item) invokes the genus (the class of items) to which that species belongs as well as related species in that genus. Likewise, the recitation of a genus invokes the species known in the art. Furthermore, it is recognized that as technology develops, a number of additional alternatives to achieve an aspect of the invention may arise. Such advances are hereby incorporated within their respective genus, and should be recognized as being functionally equivalent or structurally equivalent to the aspect shown or described.

Second, the only essential aspects of the invention are identified by the claims. Thus, aspects of the invention, including elements, acts, functions, and relationships (shown or described) should not be interpreted as being essential unless they are explicitly described and identified as being essential. Third, a function or an act should be interpreted as incorporating all modes of doing that function or act, unless otherwise explicitly stated (for example, one recognizes that "tacking" may be done by nailing, stapling, gluing, hot gunning, riveting, etc., and so a use of the word tacking invokes stapling, gluing, etc., and all other modes of that word and similar words, such as "attaching"). Fourth, unless explicitly stated otherwise, conjunctive words (such as "or", "and", "including", or "comprising" for example) should be interpreted in the inclusive, not the exclusive, sense. Fifth, the words "means" and "step" are provided to facilitate the reader's understanding of the invention and do not mean "means" or "step" as defined in §112, paragraph 6 of 35 U.S.C., unless used as "means for—functioning—" or "step for—functioning—" in the claims section.

Computer Systems as Software Platforms

A computer system (or, system) typically includes hardware capable of executing machine-readable instructions, as well as the software for executing acts (typically machine-readable instructions) that produce a desired result. In addition, a computer system may include hybrids of hardware and software, as well as computer sub-systems.

Hardware generally includes processor-capable platforms, such as client-machines (also known as personal computers or servers), and hand-held processing devices (such as smart phones, personal digital assistants (PDAs), or personal computing devices (PCDs), for example. Furthermore, hardware typically includes any physical devices that are capable of storing machine-readable instructions, such as memory or other data storage devices. Other forms of hardware include hardware sub-systems, including transfer devices such as modems, modem cards, ports, and port cards, for example. The way hardware is organized within a system is known as the system's architecture (discussed below).

Software includes machine code stored in memory, such as RAM or ROM, or machine code stored on devices (such as floppy disks, or a CD ROM, for example). Software may include executable code, an operating system, or source or object code, for example. In addition, software encompasses any set of instructions capable of being executed in a client machine or server—and, in this form, is often called a program or executable code.

Programs often execute in portions of code at a time. These portions of code are sometimes called modules or code-segments. Often, but not always, these code segments are identified by a particular function that they perform. For example, a counting module (or "counting code segment") may monitor the value of a variable. Furthermore, the execution of a code segment or module is sometimes called an act. Accordingly, software may be used to perform a method which comprises acts. In the present discussion, sometimes acts are referred to as steps to help the reader more completely understand the exemplary embodiment.

Software also includes description code. Description code specifies variable values and uses these values to define attributes for a display, such as the placement and color of an item on a displayed page. For example, the Hypertext Transfer Protocol (HTTP) is the software used to enable the Internet and is a description software language.

Hybrids (combinations of software and hardware) are becoming more common as devices for providing enhanced functionality and performance to computer systems. A hybrid is created when traditionally software functions are directly manufactured into a silicon chip—this is possible since software may be assembled and compiled into ones and zeros, and, similarly, ones and zeros can be represented directly in silicon. Typically, the hybrid (manufactured hardware) functions are designed to operate seamlessly with software. Accordingly, it should be understood that hybrids and other combinations of hardware and software are also included within the definition of a computer system and are thus envisioned by the invention as possible equivalent structures and equivalent methods.

Computer sub-systems are combinations of hardware or software (or hybrids) that perform some specific task. For example, one computer sub-system is a soundcard. A soundcard provides hardware connections, memory, and hardware devices for enabling sounds to be produced and recorded by a computer system. Likewise, a soundcard may also include software needed to enable a computer system to "see" the soundcard, recognize the soundcard, and drive the soundcard.

Sometimes the methods of the invention may be practiced by placing the invention on a computer-readable medium. Computer-readable mediums include passive data storage, such as a random access memory (RAM) as well as semi-permanent data storage such as a compact disk read only memory (CD-ROM). In addition, the invention may be embodied in the RAM of a computer and effectively transform a standard computer into a new specific computing machine.

Data structures are defined organizations of data and enable an embodiment of the invention. For example, a data structure may provide an organization of data, or an organization of executable code (executable software). Furthermore, data signals are carried across transmission mediums and store and transport various data structures, and, thus, may be used to transport the invention. It should be noted in the following discussion that acts with like names are performed in like manners, unless otherwise stated.

Description of the Drawings

Figure 1:
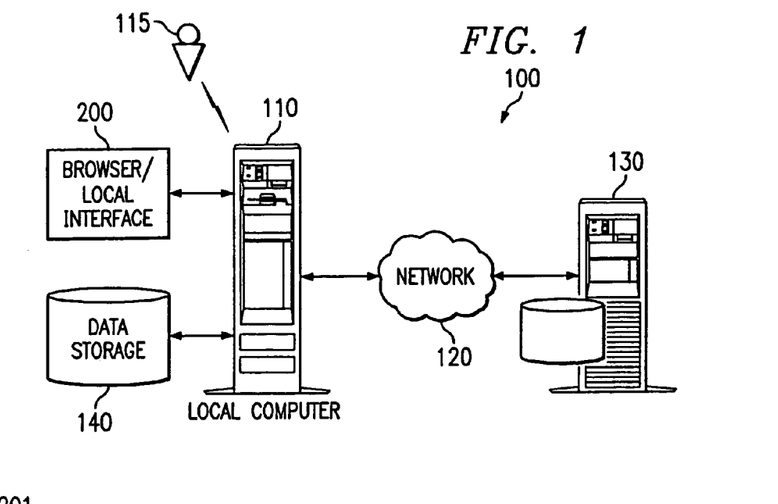
FIG. 1 illustrates a specific form of a network architecture.

Many persons are familiar with the way a computer network is set up—the way a computer network is set up is technically referred to as a network architecture. FIG. 1 illustrates a specific form of a network architecture, which is a browser-interface architecture 100 configured to support the invention across a network 120. A user 115 interacts with online-content by issuing requests and receiving data using a browser-interface 200, via a host computer 130. A browser-interface 200 interprets, renders, and presents information to the user 115 in the form of visual stimuli. Common browser interfaces include monitors, audio speakers, keyboards, microphones, a mouse, and other forms of audio/visual input or output, as well as other forms of data input. Common host computers include computing machines that operate using network software, as well as Windows, Sun, and Microsoft operating system, for example.

The invention operates in conjunction with the browser-interface 200 to detect events that may cause changes in the parameters (or "technical parameters", in the form of data) that may impact the visual stimuli being displayed to the user 115. The invention then records those parameters that are relevant to the immediate visual stimuli being displayed to the user 115 in a predetermined format to a data storage device 140. The data storage device 140 may be local to or remote from computer 110. In addition, common data storage devices include, for example, cashed memory devices, as well as electrical and photonic storage devices. The lightening bolt between the user 115 and the computer 110 represents user-based eye position feedback that provides data regarding the position on the browser interface 200 a user's eyes are looking at, as well as information about the user's eyes, such as eye dilation.

Figure 2:
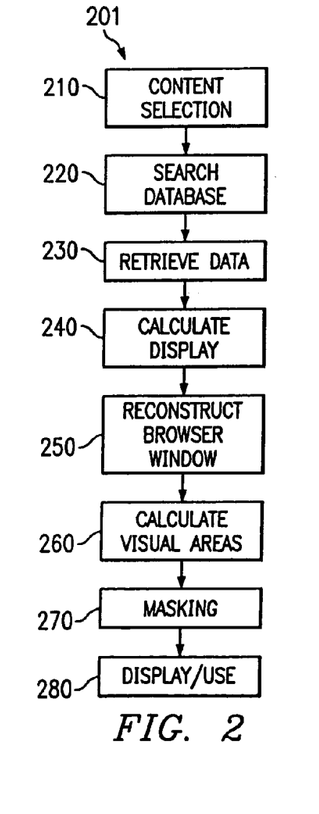
FIG. 2 is a block-flow diagram of one embodiment of a visual stimuli retrieval algorithm.

A reader may better understand the invention by reviewing a visual stimuli retrieval algorithm 201. Accordingly, FIG. 2 is a block-flow diagram of one embodiment of a visual stimuli retrieval algorithm 201 (the retrieval algorithm 200). In operation, a browser interface architecture 100 supports the retrieval algorithm 201, enabling it to calculate and render compositions displayed to the operator 115. The browser interface 200 allows an operator 115 to enter or change parameters that specify which articles of online content are to be reconstructed. Then, these parameters are used to construct visual stimuli from previously recorded data stored in the database 140. How the data and parameters are rendered to reflect a specific period of time through a specific form of composition is also operator selectable.

As illustrated, in a content selection act 210, an operator 115 specifies article(s) of online content to be displayed, preferably by providing its unique identifying name. In the preferred embodiment, the operator 115 selects the name of the article from a list of available articles according to its original network address or a substitute name, both of which are stored in the database 140. Once the operator 115 has specified an article (or articles) to be retrieved, these parameters are then used to search the database 140 for the appropriate data in a search database act 220. In the preferred embodiment, the search database act 220 involves identifying each unique instance of the article of online content and recording the unique identification (ID) assigned to its browser window (sometimes called a web page). The search database act 220 then enumerates through each instance of a child window with a corresponding reference to the parent window's unique ID. The resulting data set includes the unique IDs of both the article's original parent browser window, as well as all child windows which comprise the visual stimuli originally displayed to the user.

Next, the search results are passed to a retrieve data act 230, where the data elements needed are retrieved to facilitate down-stream processes. Then, a calculate display act 240 calculates the original size and position of each browser window as it was originally displayed to the user. This information is then used to reconstruct the browser window image in a reconstruct browser window act 250, that in one embodiment relies on graphical information stored in the database 140, using a specific form of composition. Next, a calculate visual areas act 260 is used to determine which areas of the browser window were actually visible to the user within the period of time specified by the operator 115. These calculations are then used to colorize (mask) those areas of the composition which were not visible to the user in a masking act 270. The resulting composition is then displayed to the operator 115 within the context of the browser interface 200, and the composition is usable for data gathering, retrieval, and use purposes, in a display/use act 280.

FIG. 3 illustrates database information used, and corresponding containers used, to recreate visual stimuli observed through a browser interface during a specific instance in time. The reconstruction is based on previously recorded data, and the method embodied as a visual stimuli algorithm 300 illustrated in FIG. 3b. Accordingly, the visual stimuli algorithm 300 recreates exactly what the user/observer saw in the browser at a prior point in time. The method of reconstruction in general, and the visual stimuli algorithm 300 particularly, in one embodiment, relies on stored information that contains a unique ID for each: browser window (the window ID field 315) displayed during a user's interface experience, the unique ID of the browser window's parent window (the parent ID field 316), a time-stamp indicating when an event occurred (the time stamp field 317) which may cause a change in the visual stimuli being displayed to the user, a unique ID for each event (the event ID field 318), a categorical description of the event type (the event type field 319), the two-dimensional position of the browser window as it appeared to the user (the window position field 320), the two-dimensional size of the browser window as it appeared to the user (the window size field 321), the network address of the online content immediately displayed within the browser window (the network address field 322), the two-dimensional offset of the online content within the browser window (the scroll offset field 323), a graphical image of the content as it appeared to the user within the browser window (the window image field 324), and a graphical image of the entire field of visual stimuli in its native size and aspect ratio which could be viewed by the user if they were to scroll within the browser window (the content image filed 325).

Figure 3A:
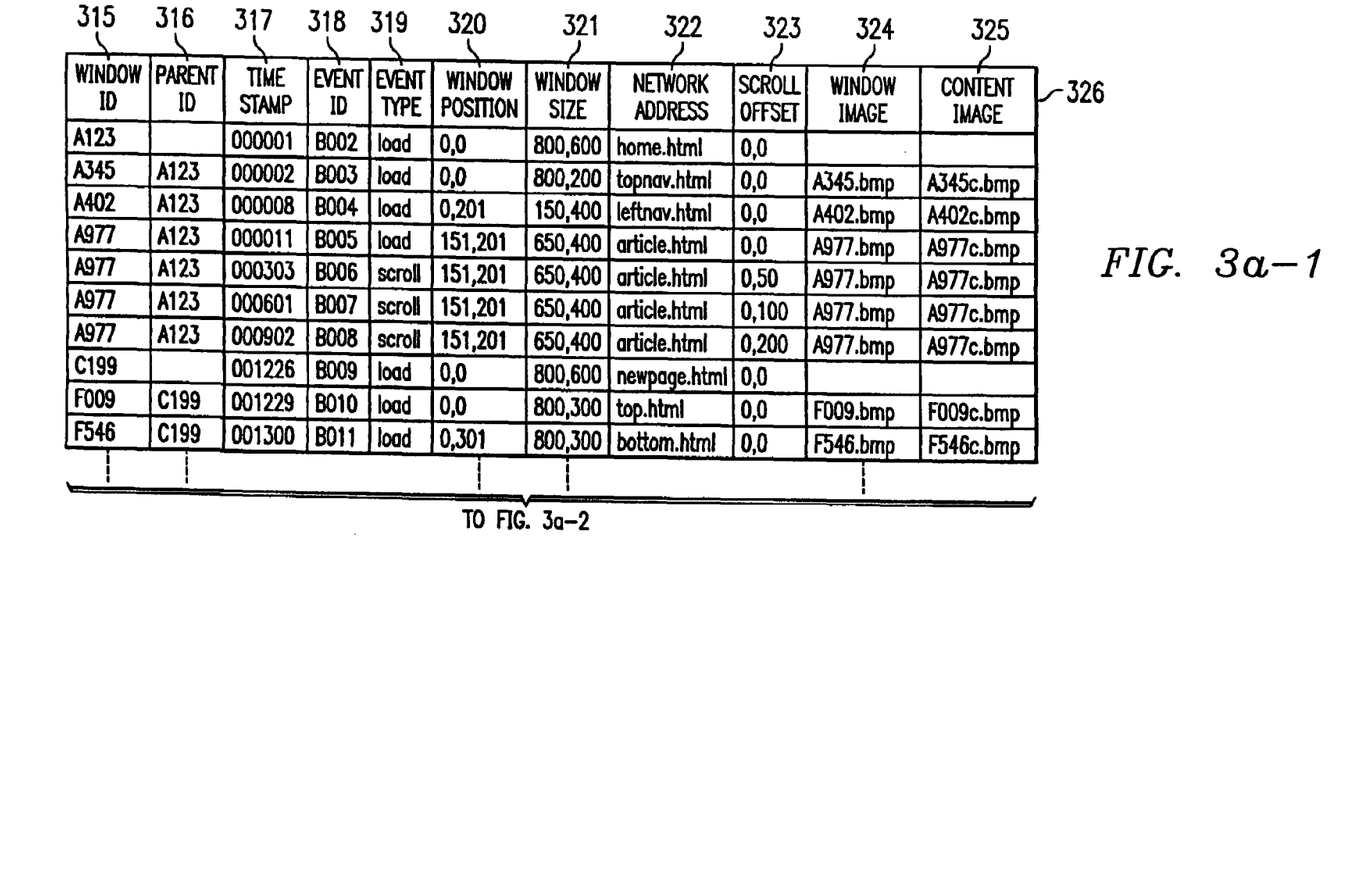
FIG. 3a illustrates the method used to reconstruct the entire field of visual stimuli that could be observed by a user if they were to scroll within one or more browser windows within the browser-based interface, using stored information.
FIG. 3b illustrates a visual stimuli algorithm.
Figure 3A:
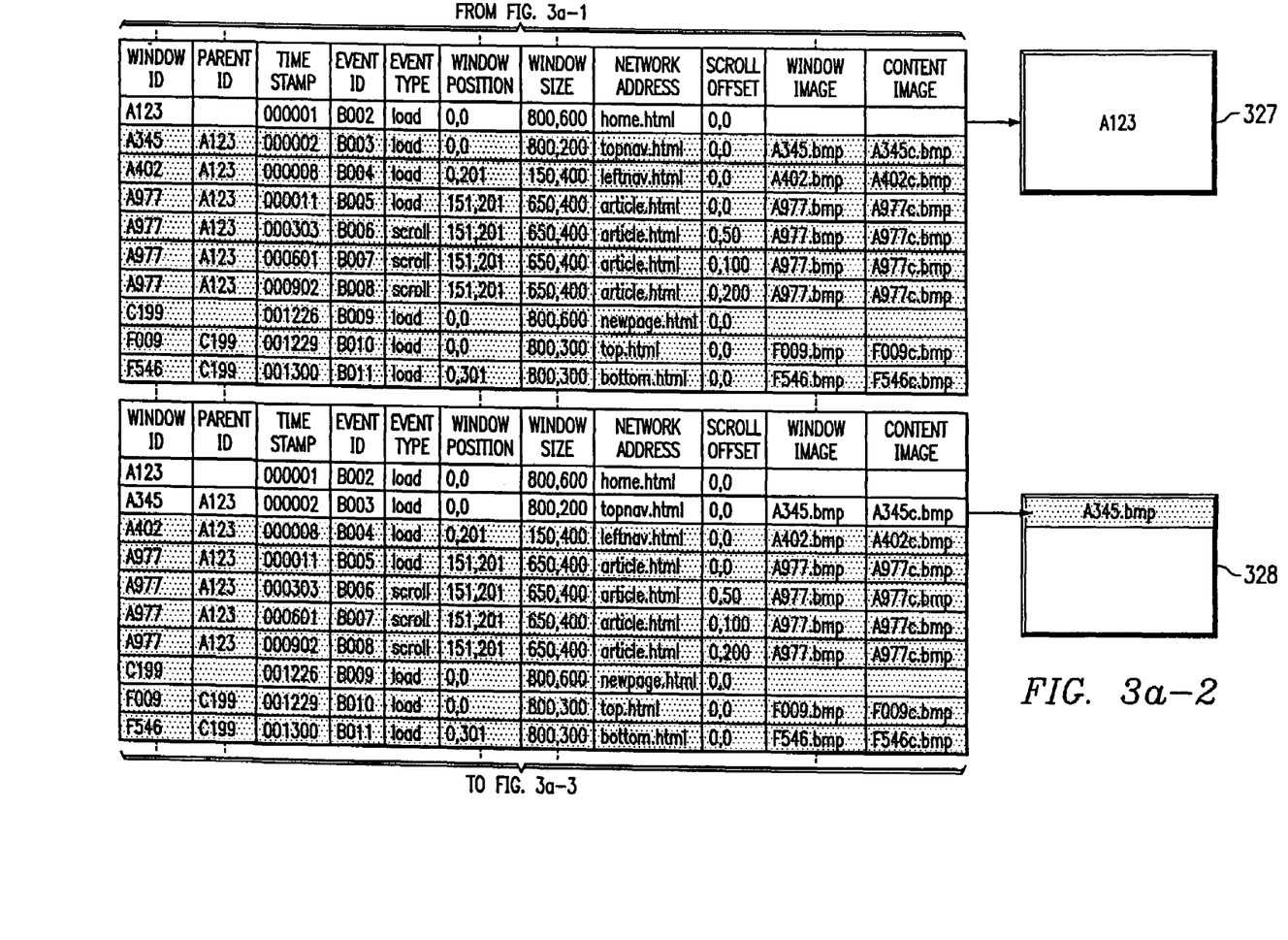
Figure 3A:
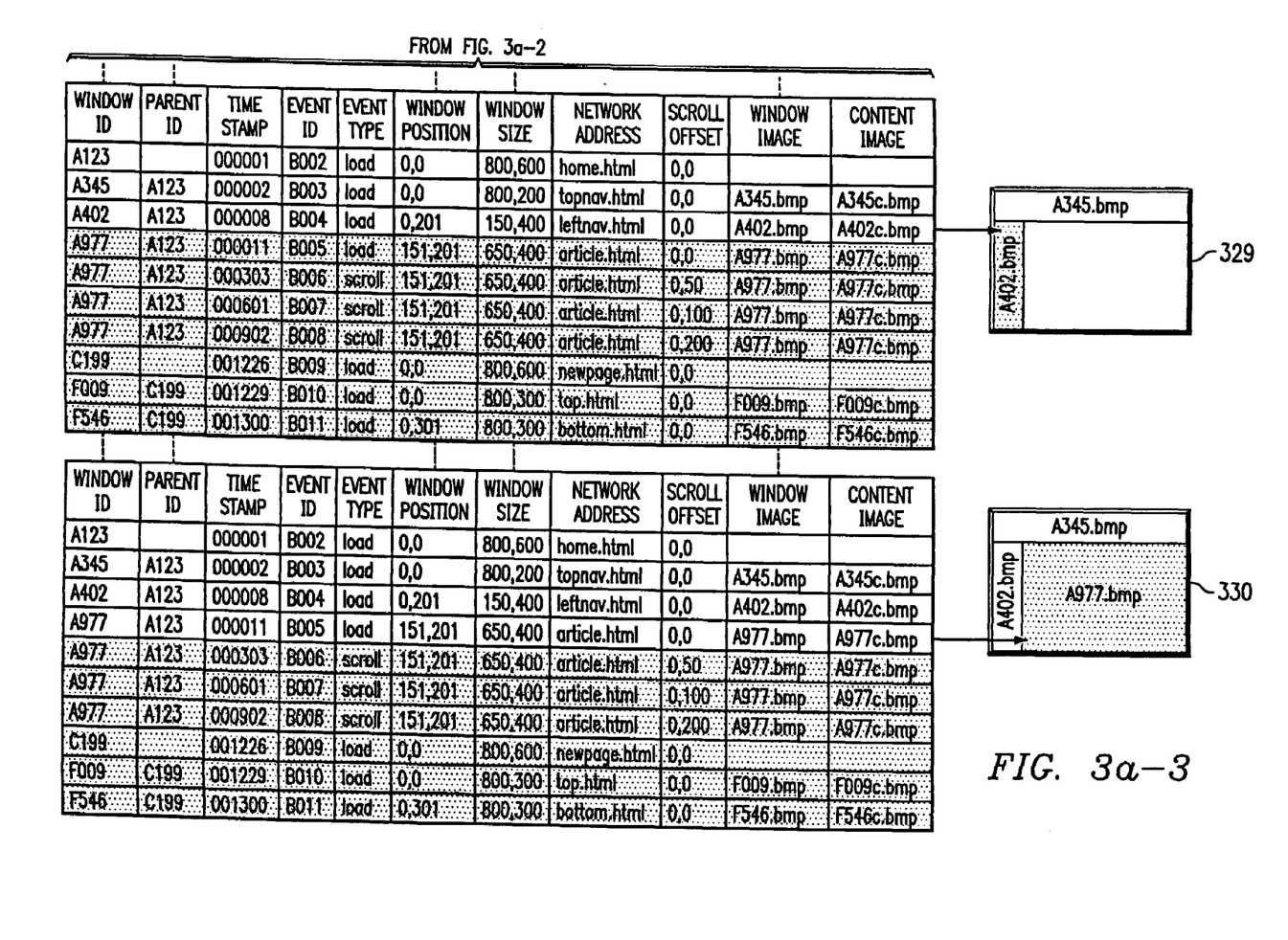
Figures 3B, 4B:
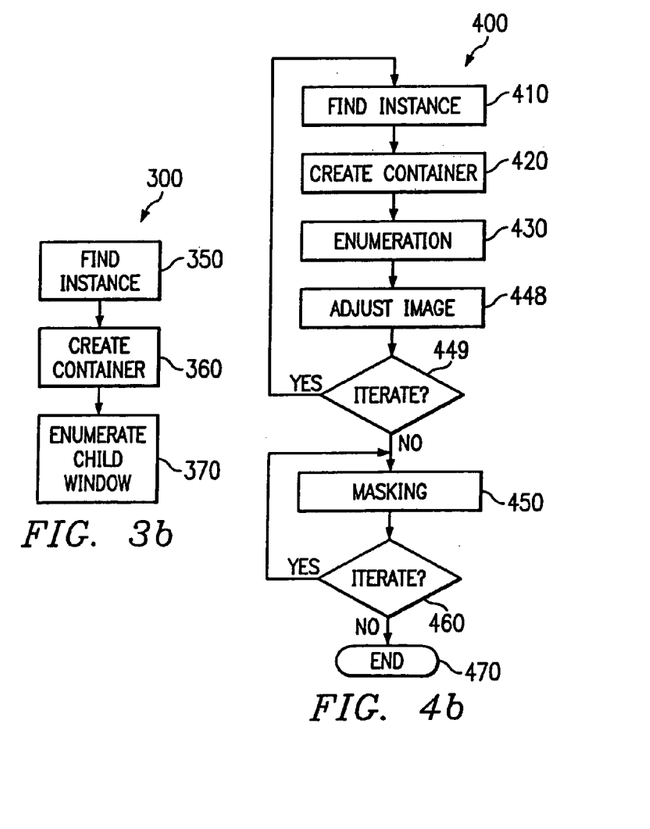
FIG. 4b illustrates a creation algorithm.

The first act in the visual stimuli algorithm 300 is a find instance act 350. The find instance act 350 finds a unique instance of an article of online content using a network address (or substitute name) from the network address field 322, at a time period specified in the time stamp field 317, and as indicated by a load event from the event type field 319. Next, a container 327 is created in a create container act 360. A container is, in general, an outline of the aggregate area that comprises the parent and child web pages that are viewable (as opposed to viewed). The container is initially sized to the two-dimensional size of the browser window as stored in the window size field 321, with content as indicated in the network address field 322.

Next, each "dependent" child window is enumerated in an enumerate child window act 370, via the parent window's unique ID (from the window ID field 315), and then compared to the parent window ID (from the parent ID field 316) provided for each stored event indicated in the event ID field 318. Within each iteration, a graphical image of the child window's content 324 (from the window image field 324) is retrieved, written to the container 327, and arranged as a child window (the dark portion of a modified container 328) to create the modified container 328. Additional child windows (indicated as dark areas) are added to the container to create a second modified container 329, and a third modified container 330, based on the two-dimensional position at which they were originally recorded in the window size field 321.

One skilled in the art will understand that there are many methods for systemically assembling an image based on stored information which could be employed to form this composition. In a preferred embodiment of an application written in Visual Basic® from Microsoft Corporation® hosted on a computer running the Microsoft Windows® operating system, an image control is used based on functions found in the MSVBVM60.DLL. Using the "Picture-Box" control, a control array is created in which each new image is loaded an arranged. The parent image control is then used to generate a bitmapped image for display to the user.

Figure 4A:
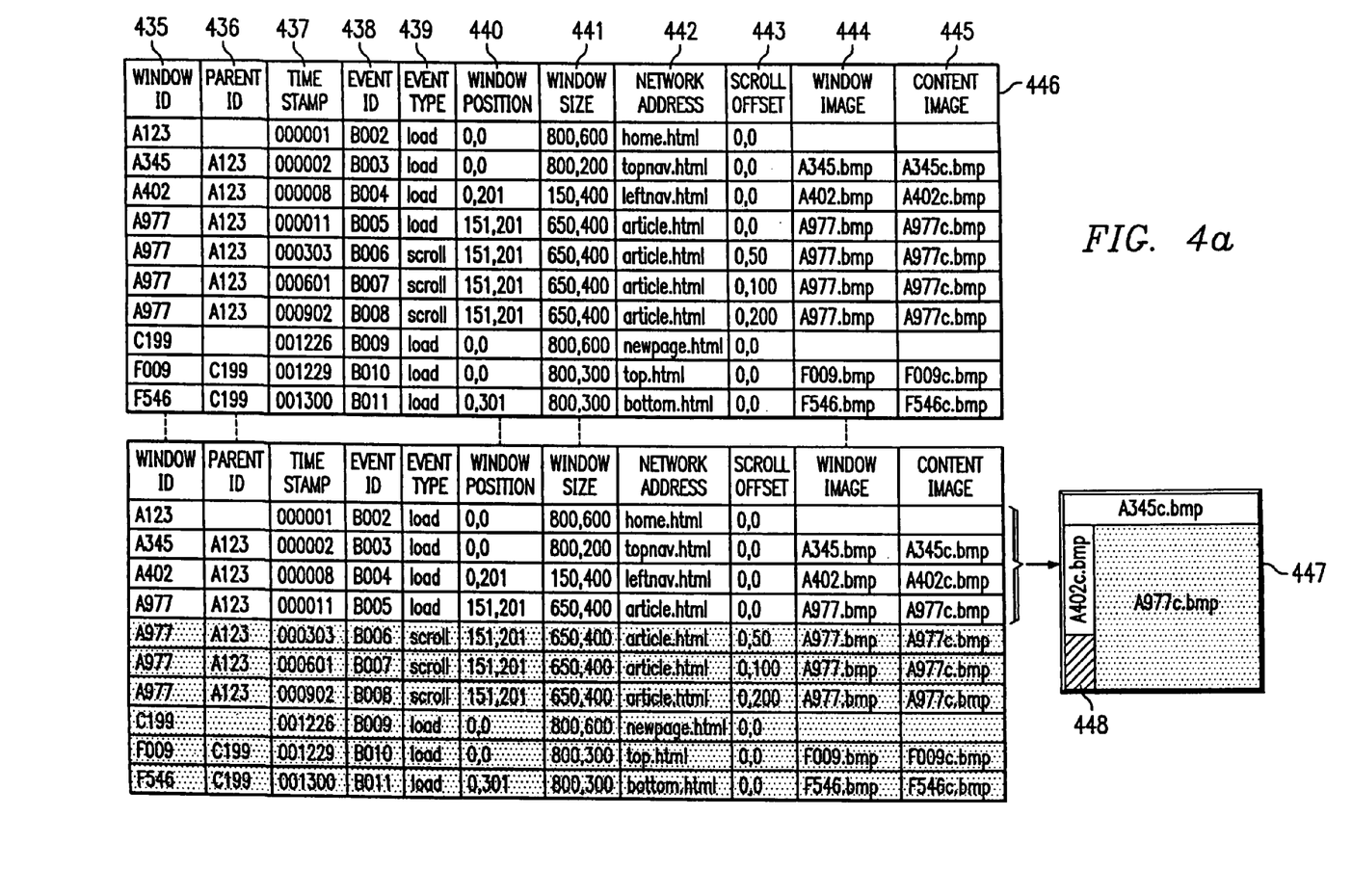
FIG. 4a illustrates database information used, and a corresponding container, to recreate visual stimuli observed through a browser interface.

FIG. 4 illustrates a method used to reconstruct the entire field of visual stimuli that could be observed by a user if they were to scroll within and/or among one or more web pages parent or child) within the browser-based interface. This specific form of composition allows each article of online content to be represented in its entirety, despite its native size and aspect ratio. Furthermore, FIG. 4b illustrates a visual stimuli creation algorithm 400 (the creation algorithm 400) that shows how database information is used, and a corresponding container is used, to recreate the entire web page of visual stimuli observable (accessible by a user) through a browser interface during a specific instance in time. In a preferred embodiment, the creation algorithm 400 relies on stored information (shown as record heading 446) to reconstruct visual stimuli using a specific form of composition.

First, the creation algorithm 400 finds each new instance of an article of online content using a network address in a find instance act 410. Preferably, the online content is associated with a time period (via the time stamp field 437), and a load event (identified via an event type field 439). Next, in a create container act 420, a container is created that is equal in size to the two-dimensional size of the browser window, as defined in the window size field 441.

Next, in an enumeration act 430, each child web page is enumerated through the parent window's unique ID (from the window ID field 435) as a key, and compared to the parent window ID (from the parent ID field 436) provided for each stored event, as defined in the event ID field 438. With each iteration, a graphical image of the child web page content (defined by the content image field 445) in its native size and aspect ratio is retrieved and written to the container 447. It is then arranged in an adjust image act 448 based on the two-dimensional position at which it was originally "displayed" in as recorded by the window position field 440.

In the event that the native size and aspect ratio of the content image, as recorded in the content image field 445, is larger than the original size and aspect ratio of the browser window in which it was displayed, as recorded in the window size field 441, then the adjust image act 448 proceeds to adjust the two-dimensional arrangement of the image by adding the appropriate degree of placement to its original horizontal or vertical coordinates so as not to obscure any other article of online content previously placed in the composition 447. In other words, if a child web page, such as a frame, is too big or too offset to be viewed in the browser-sized container, then the position and the size of the child web page are taken into account by growing or adjusting the container. In practice, this would appear to be a web-page having non-viewable frame portions.

Thus, the two-dimensional size of the original container 447 is increased to accommodate for the increased size and aspect ratio of the composition as dictated by the arrangement of the child web pages/window images. Next, an iteration query 449 takes place where it is determined if additional child web pages need to be placed into the container. If so, then the creation algorithm 400 returns to the find instance act 410 and the next child web page is accounted for. If it is determined in the iterate query 449 that the container is completed (meaning that all possible viewable parent and child portions of a web-page have been gathered and correctly placed), then the creation algorithm proceeds to a masking act 460.

Next, in the masking act 450, those areas of the container composition that are left void by the placement of the child window images are masked via colorization to clearly illustrate that these areas do not represent viewable content, and were not part of the original composition 447.

Figure 5A:
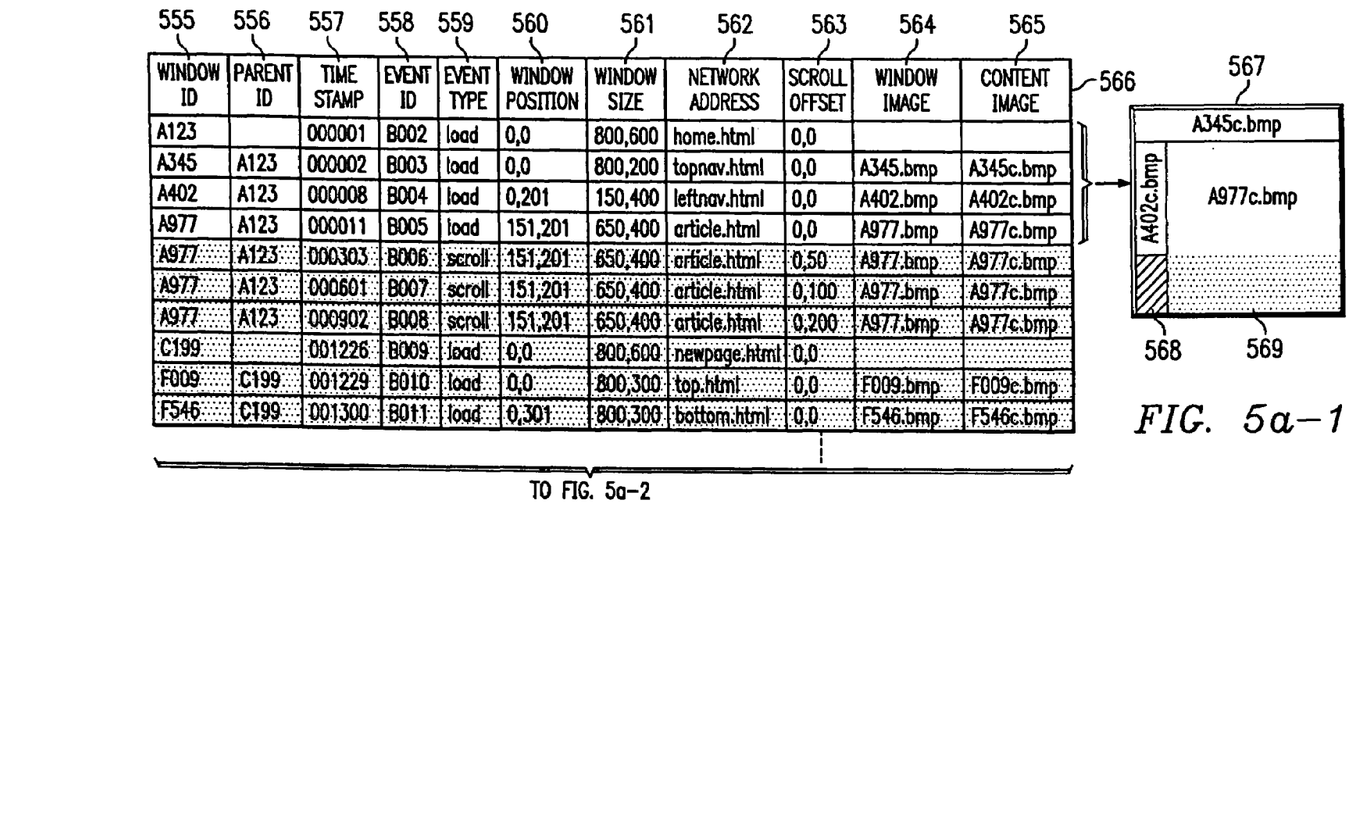
FIG. 5a illustrates a view of dynamic reconstruction of the field of visual stimuli as it was originally observed by a user, with colorization of relevant areas.
Figure 5A:
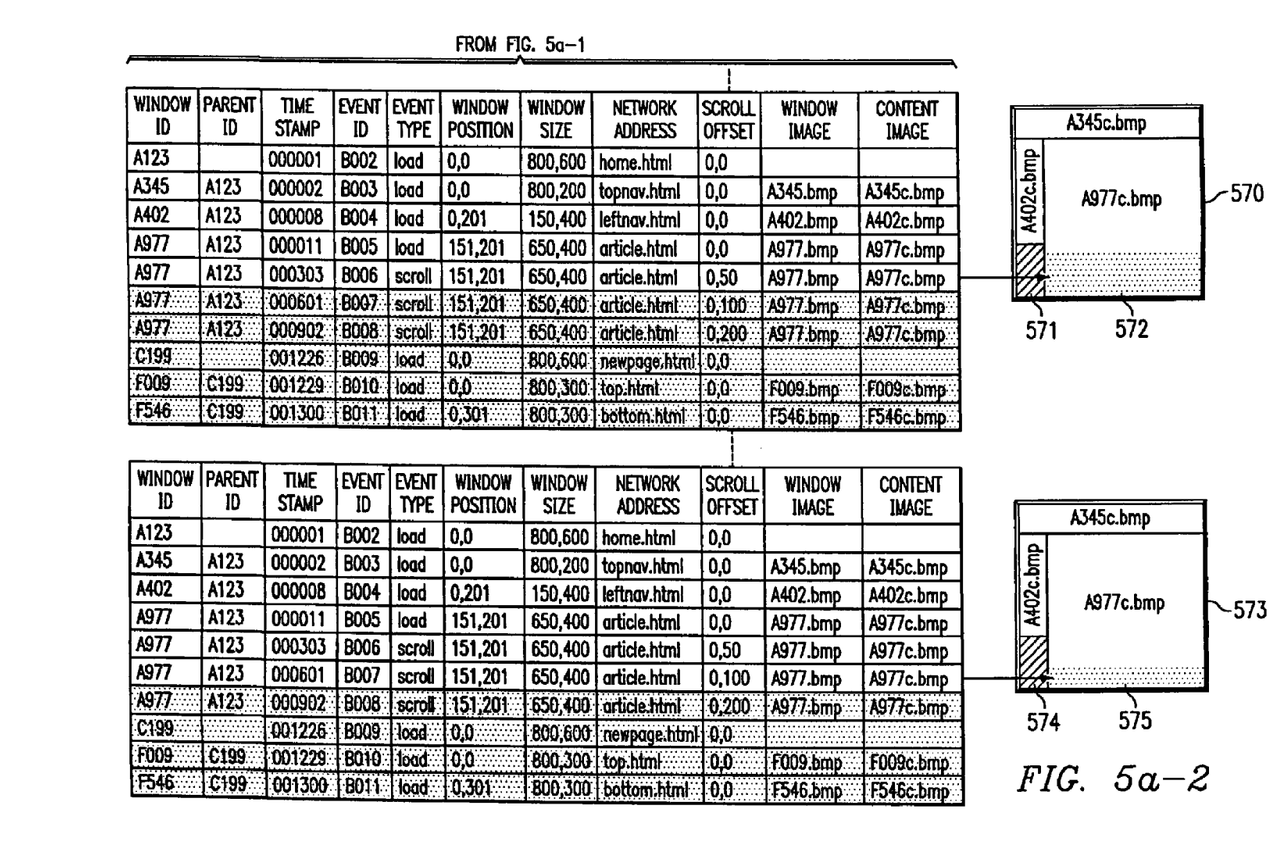

The process as discussed thus far instantiates a single instance of a viewable area. However, to provide more useful recreations, the creation algorithm 400 should be able to accommodate the images viewed by an observer, by taking into account those areas of a web page actually viewed by a user. Accordingly, FIG. 5 illustrates a view of dynamic reconstruction of the field of visual stimuli as it was originally observed by a user, with colorization of relevant areas, and should be read in conjunction with the creation algorithm 400. Stored information, parameters, and data are used to reconstruct visual stimuli as described thus far in the creation algorithm 400. Now, the creation algorithm enumerates the container through each instance of an article of content as recorded (typically, through a scroll events field 559) within a specified period of time. In other words, the creation algorithm 400 takes into account what portion of the web page was actually displayed at a point in time by masking those portions of the container that were not displayed at the point in time. During each iteration, those areas of the content image (recorded in the content image field 565) which were not visible as indicated by the scroll offset (stored as the scroll offset field 563) of the content image field 565 within the browser window (defined in the window size field 561) are masked, or "colorized"—these colorized portions are illustrated as a first colorized portion 569, a second colorized portion 572, and a third colorized portion 575, to illustrate that these regions of their respective compositions were not viewable during the periods in time associated with the first colorized portion 569, the second colorized portion 572, and the third colorized portion 575. Alternatively, in the same or a similar manner, masking could also identify the portions of a web page that were not in fact viewed. This process is preferably cumulative for the duration of the specified period.

Accordingly, the creation algorithm 400 includes an iteration query 460 that seeks to see if an iteration of the creation algorithm 400 is desired to dynamically provide for the construction of the visual stimuli observed by a user. If no further iterations are desired, the creation algorithm 400 proceeds to an end act 470, and the creation algorithm 400 concludes. If, however, it is detected in the iterate query 460 that an additional instance of the visual stimuli is desired, then the creation algorithm 400 returns to the masking act 450.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

We claim:

1. A method of reconstructing visual stimuli observable through a browser-based interface, comprising:
   receiving user defined parameters for content visual stimuli for to be reconstructed;
   receiving data called by the user defined parameters related to the visual stimuli;
   displaying a portion of the visual stimuli based on the data;
   reconstructing the displayed portion of the visual stimuli as a function of the user defined parameters, wherein the reconstructed displayed portion represents the visual stimuli displayed during a time period specified by a user; and
   displaying the reconstructed visual stimuli based on the received data, and masking an area of the content during reconstruction that was not displayed during the specified time period.

2. The method of claim 1 wherein the data is a network address of online content displayed within a browser window at a point in time during the specified time period.

3. The method of claim 1 wherein the data is a two-dimensional offset of the online content displayed within a browser window.

4. The method of claim 1 wherein the data is a two-dimensional position of a pointing device.

5. The method of claim 1 wherein the data comprises textual and binary objects systematically displayed within each browser window.

6. The method of claim 1 wherein the data is a graphical image of online content as displayed in a browser window.

7. The method of claim 1 wherein the data is an inventory of objects that comprise online content, and a two-dimensional position of each object in a browser window.

8. A method of reconstructing visual stimuli observable through a browser-based interface, comprising:
   receiving user defined parameters for content visual stimuli for to be reconstructed;
   receiving data related to the content visual stimuli;
   displaying a portion of the content visual stimuli based on the data; and
   reconstructing the displayed portion, wherein the reconstructed displayed portion represents visual stimuli as it was previously displayed; and wherein the data is a user eye position; wherein masking an area of the content during reconstruction that was not displayed during the specified time period.

9. A method of reconstructing visual stimuli observable through a browser-based interface, comprising:
   receiving user defined parameters for content visual stimuli for reconstruction;
   receiving data related to the content visual stimuli;
   displaying a portion of the content visual stimuli based on the data;
   reconstructing the displayed portion, wherein the reconstructed displayed portion represents visual stimuli as it was previously displayed and masking an area of the content during reconstruction that was not displayed during the specified time period; and
   wherein the data is a user pupil dilation.

10. The method of claim 1 further comprising displaying a portion of a parent web page in a child page as a function of a user input during the specified time period.

11. The method of claim 1 further comprising calculating a size of a visual area displayed.

12. The method of claim 11 further comprising displaying the unmasked content in relation to the masked content during the specified time period.

13. The method of claim 11 wherein the masking is achieved via colorizing of the content during the specified time period.

14. The method of claim 1 wherein data is stored as an article identifiable as an alphanumeric string.

15. The method of claim 1 wherein the content is displayed in a parent web page and a child web page, further comprising assigning a unique ID to the displayed parent web page and the displayed child web page.

16. The method of claim 15 further comprising calculating a size and position of the child web page during reconstruction.

17. The method of claim 1 further comprising time-stamping an event that occurred in the displayed content during the specified time period.

18. A system for reconstructing visual stimuli observable through a browser-based interface, comprising:
   means for receiving visual stimuli for reconstruction;
   means for receiving data related to the visual stimuli;
   means for displaying an amount of visual stimuli to display based on the data;
   means for reconstructing the displayed portion, wherein the reconstructed displayed portion represents visual stimuli as it was previously displayed during a time period specified by the user; and
   means for displaying the reconstructed visual stimuli and masking an area of the content during reconstruction that was not displayed during the specified time period.

19. A computer readable medium comprising instructions for:
   receiving an article of online content to be reconstructed;
   receiving a specified time period from a user to reconstruct the online content that was visible during the specified time period;

receiving at least one composition used to represent visual stimuli as it was previously displayed; and reconstructing the previous displayed visual stimuli based on the article of online content and the specified time period, using the at least one composition; and displaying the reconstructed previously displayed visual stimuli and masking an area of the content during reconstruction that was not displayed during the specified time period.

20. A computer readable medium comprising instructions for:

receiving visual stimuli;

receiving data related to the visual stimuli;

displaying a portion of the visual stimuli;

reconstructing the displayed portion of visual stimuli as a function of a user's eye position; and displaying the reconstructed previously displayed visual stimuli and masking an area of the content during reconstruction that was not displayed during the specified time period.

21. A method of reconstructing visual stimuli, comprising:

receiving visual stimuli;

receiving data related to the visual stimuli;

displaying a portion of the visual stimuli;

reconstructing the displayed portion of visual stimuli as a function of a user's eye position; and displaying the reconstructed previously displayed visual stimuli and masking an area of the content during reconstruction that was not displayed during the specified time period.

22. A system for reconstructing visual stimuli, comprising:

a module receiving visual stimuli;

a module receiving data related to the visual stimuli;

a module displaying a portion of the visual stimuli;

a module reconstructing the displayed portion of visual stimuli as a function of a user's eye position; and a module displaying the reconstructed previously displayed visual stimuli and masking an area of the content during reconstruction that was not displayed during the specified time period.

* * * * *

UNITED STATES PATENT AND TRADEMARK OFFICE
CERTIFICATE OF CORRECTION

| | | |
|---|---|---|
| PATENT NO. | : 7,200,815 B2 | Page 1 of 1 |
| APPLICATION NO. | : 09/812394 | |
| DATED | : April 3, 2007 | |
| INVENTOR(S) | : Kenneth H. Crain and William K. Vanover | |

It is certified that error appears in the above-identified patent and that said Letters Patent is hereby corrected as shown below:

Column 11 line 34 in Claim 1 should read -- receiving user defined parameters for visual --
Column 11 line 35 in Claim 1 should read -- stimulti to be reconstructed; --

Column 12 line 1 in Claim 8 should read -- receiving user defined parameters for visual --
Column 12 line 2 in Claim 8 should read -- stimuli to be reconstructed; --
Column 12 line 9 in Claim 8 should read -- user eye position and masking an area of the --

Column 12 line 14 in Claim 9 should read -- receiving user defined parameters for visual --
Column 12 line 16 in Claim 9 should read -- receiving data related to the visual stimuli;--
Column 12 line 17 in Claim 9 should read -- displaying a portion of the visual stimuli based on --

Column 13 line 2 in Claim 19 should read -- stimuli as it was previously displayed; reconstructing --

Signed and Sealed this

Eighteenth Day of March, 2008

JON W. DUDAS
*Director of the United States Patent and Trademark Office*